United States Patent
Kim et al.

(10) Patent No.: US 8,173,084 B2
(45) Date of Patent: May 8, 2012

(54) YB:Y₂O₃ CERAMIC POWDERS

(75) Inventors: Woohong Kim, Lorton, VA (US);
Jasbinder S. Sanghera, Ashburn, VA (US); Guillermo R Villalobos, Springfield, VA (US); Shyam S Bayya, Ashburn, VA (US); Ishwar D. Aggarwal, Fairfax Station, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 267 days.

(21) Appl. No.: 12/620,621

(22) Filed: Nov. 18, 2009

(65) Prior Publication Data
US 2010/0160144 A1    Jun. 24, 2010

Related U.S. Application Data

(60) Provisional application No. 61/138,730, filed on Dec. 18, 2008.

(51) Int. Cl.
*C01G 7/00* (2006.01)
(52) U.S. Cl. .................. 423/21.1; 423/263; 423/275
(58) Field of Classification Search ............... 423/21.1, 423/263, 275
See application file for complete search history.

(56) References Cited

U.S. PATENT DOCUMENTS

| | | | |
|---|---|---|---|
| 5,492,870 A * | 2/1996 | Wilcox et al. | ............ 501/80 |
| 2004/0218345 A1* | 11/2004 | Yadav et al. | ............ 361/500 |
| 2007/0105228 A1 | 5/2007 | Vanderspurt et al. | |
| 2008/0026220 A9 | 1/2008 | Bi et al. | |
| 2008/0175787 A1 | 7/2008 | Ma et al. | |
| 2008/0274028 A1 | 11/2008 | Lin et al. | |
| 2008/0292520 A1 | 11/2008 | Matsuura et al. | |

OTHER PUBLICATIONS

Search report and written opinion of ISA in PCT Application No. PCT/US2009/066072.
R. Subramanian, R Shankar), S. Kavithaa, S.S. Ramakrishnan, P.C. Angelo, H. Venkataraman, "Synthesis of nanocrystalline yttria by sol-gel method," Materials Letters 48 Ž2001. 342-346.
Henryk Tomaszewski, Helena Weglarz, and Roger De Gryse, "Crystallization of Yttria Under Hydrothermal Conditions,"Journal of the European Ceramic Society 17 (1997) 403-406.

* cited by examiner

*Primary Examiner* — Steven Bos
(74) *Attorney, Agent, or Firm* — Amy Ressing; Joslyn Barritt

(57) ABSTRACT

A high purity nano-sized $Yb^{3+}$ doped $Y_2O_3$ ($Yb:Y_2O_3$) ceramic powder with a narrow size distribution and without hard agglomerates is provided. Also provided is a process for manufacturing the same wherein water in the reaction bath is replaced by a non-water washing agent having little or no hydrogen bonding capability to inhibit the formation of hard agglomerates in the ceramic powder.

21 Claims, 2 Drawing Sheets

YB:Y₂O₃ CERAMIC POWDERS

CROSS-REFERENCE

This application claims the benefit of priority based on U.S. Provisional Patent Application No. 61/138,730 filed on Dec. 18, 2008, the entirety of which is hereby incorporated by reference into the present application.

TECHNICAL FIELD

The present invention relates to Yb:Y$_2$O$_3$ ceramic powders and processes of making the same.

BACKGROUND

Ytterbium-doped yttria (Yb:Y$_2$O$_3$) is an excellent laser host material due to its hardness, strength, and transparency in the range of 0.4 to 10 μm. Its thermal properties enable it to operate at higher power and dissipate heat generated during laser operation better than other laser hosts such as yttrium aluminum garnet (YAG). However, single crystal Yb:Y$_2$O$_3$ is difficult to produce in large sizes and the necessary configurations for high power lasers.

Polycrystalline Yb:Y$_2$O$_3$ can also achieve this high performance if it is produced in a manner as to produce a fine grained material with clean grain boundaries, very low porosity, and less than 10 ppm levels of impurities.

A transparent polycrystalline Yb:Y$_2$O$_3$ laser material can be manufactured by densifying Yb:Y$_2$O$_3$ powder. However, attempts to fabricate transparent ceramics with traditional undoped Y$_2$O$_3$ powders have been unsuccessful due to the large size of the particles, the high impurity level, and the presence of hard agglomerates in the powder, which can lead to high scattering and absorption losses in the final material Various processes, including decomposition of the salts, co-precipitation, hydrothermal synthesis, spray drying, and sol-gel synthesis, have been reported to produce fine Y$_2$O$_3$ powders. See L. R. Furlong et al., "Sintering of Yttrium Oxide," Ceram. Bull., 45, 1051, (1966); R. Subramanian, et al, "Synthesis of nanocrystalline yttria by sol-gel method," Mater. Let., 48, 342 (2001); H. Tomaszewski, et al., "Crystallization of yttria under hydrothermal conditions," J. Eur. Ceram. Soc., 17, 403, (1997); T. Hours, et al., "Preparation and characterization of yttrium oxide by a sol-gel process," Am. Ceram. Soc. Bull., 71, 200, 1992).

Among these processes, the co-precipitation of the precursors using inorganic salts in a base condition and a subsequent calcination is the most convenient and cost effective technique, and is suitable for mass production of homogeneous powders. However, the powder produced by this process includes large, hard agglomerates, and attempts to fabricate transparent ceramics using these powders always result in an opaque or semi-transparent product containing large grain size and numerous structural and morphological defects.

Hard agglomeration is believed to be caused by the strong intra- and/or inter-molecular hydrogen bonding between hydroxide or hydroxynitrate precursors and water molecules. Small and extremely polar water molecules attract the precursors to pack close together upon drying and cause the precursor molecules to agglomerate together during the drying process. Once the powder is agglomerated, it is almost impossible to break it into smaller particles or soft agglomerates. Such agglomerated powders become even harder after calcination and it makes subsequent processing very complicated and troublesome. Although such powders can be broken down into smaller particles by various milling process, even after milling, they still contain hard agglomerates having a size as large as about 10 microns. In addition, using a milling step can be problematic, especially for the production of transparent ceramic laser materials where the transparency and the lasing property is affected by even ppm level of metal impurities as well as morphological and structural defects in the ceramic, since the powder can be contaminated during the process.

Thus, to maximize the optical transparency of the ceramic and to reduce scattering, it is desirable to obtain high purity nano-sized powders without hard agglomerates by preventing hard agglomerates before they start to form.

SUMMARY

This summary is intended to introduce, in simplified form, a selection of concepts that are further described in the Detailed Description. This summary is not intended to identify key or essential features of the claimed subject matter, nor is it intended to be used as an aid in determining the scope of the claimed subject matter. Instead, it is merely presented as a brief overview of the subject matter described and claimed herein.

The present invention provides a high purity nano-sized Yb$^{3+}$ doped Y$_2$O$_3$ (Yb:Y$_2$O$_3$) ceramic powder without hard agglomerates and further provides a process for manufacturing the same wherein water in the reaction bath is replaced by a non-water washing agent having little or no hydrogen bonding capability to inhibit the formation of hard agglomerates in the ceramic powder.

DETAILED DESCRIPTION

Figure 1B:
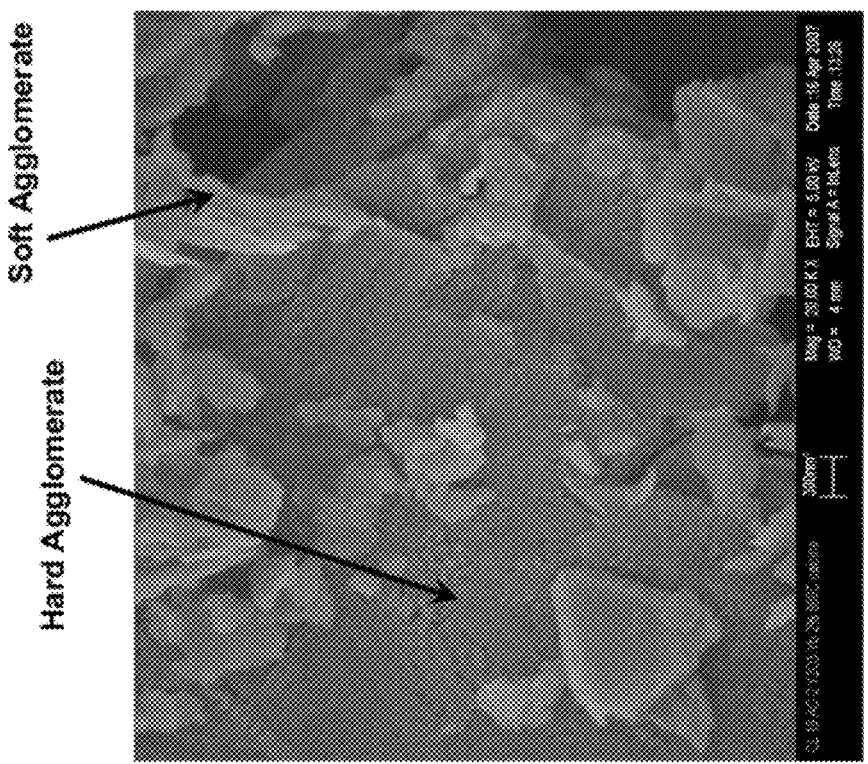
FIGS. 1A and 1B are SEM photographs of Y$_2$O$_3$ particles synthesized by conventional processes, which exhibit hard agglomerates as large as 10 μm together with soft agglomerates.

The aspects and features of the present invention summarized above can be embodied in various forms. The following description shows, by way of illustration, combinations and configurations in which the aspects and features can be put into practice. It is understood that the described aspects, features, and/or embodiments are merely examples, and that one skilled in the art may utilize other aspects, features, and/or embodiments or make structural and functional modifications without departing from the scope of the present disclosure.

As noted above, the present invention provides a high purity nano-sized Yb$^{3+}$ doped Y$_2$O$_3$ (Yb:Y$_2$O$_3$) ceramic powder with a narrow size distribution and without hard agglomerates and further provides a simple process for manufacturing the same.

A high-purity uniformly nano-sized Yb:Y$_2$O$_3$ powder having no hard agglomerates in accordance with the present invention can be used to manufacture high-quality transparent Yb:Y$_2$O$_3$ ceramics such as those described in the concurrently-filed patent application entitled "Hot-Pressed Transparent Yb:Y$_2$O$_3$ Ceramics," (Navy Case No. 98,969), which shares inventors in common with the present invention and is hereby incorporated by reference into the present application.

In accordance with the present invention, a process for producing Yb:$Y_2O_3$ nanopowders includes the steps of purifying the starting materials, precipitating the starting materials in a reaction bath to form a precursor cake, and mixing the precursor cake with a non-water washing agent having little or no hydrogen bonding capability under vigorous stirring and/or sonication to prevent the formation of hard agglomerates in the powder. The result is a high purity Yb:$Y_2O_3$ nanopowder having a uniform particle size free from hard agglomerates.

A process for producing a Yb:$Y_2O_3$ nanopowder according to the present invention can start by with the step of dissolving the starting materials in DI water. The starting materials can be any appropriate mixed solution of yttrium and ytterbium having a desired mole ratio, such as yttrium nitrate, ytterbium nitrate, yttrium chloride, ytterbium chloride, yttrium sulfate, ytterbium sulfate, yttrium oxalate, ytterbium oxalate, or their mixtures. The dissolved solution can then be purified, for example, by filtering with a submicron-sized filter to remove insoluble impurities from the solution.

The filtered solution can then be mixed in a reaction bath with a chelating agent such as ethylenediamine tetraacetic acid (EDTA) to further purify the starting materials by removing metal and/or cation impurities such as $Fe^{3+}$ metal ions which can adversely affect the optical and lasing properties of the final ceramic. During this chelation step, a high pH level of the reaction bath should be maintained, for example, a pH above about 8.5. Chelating the starting materials in this manner can significantly improve the purity of the final powders, as illustrated in the following table, which illustrates the difference in chemical impurity of the final powder with and without EDTA treatment:

|    | Impurity levels without EDTA treatment (ppm) | Impurity levels with EDTA treatment (ppm) |
| --- | --- | --- |
| Li | 4.5 | <0.05 |
| Na | 120 | 2.4 |
| Mg | 1.7 | 0.2 |
| P | 29 | 2 |
| Ca | 23 | <1 |
| Fe | 3 | 0.4 |
| Ni | 1 | 0.2 |
| Zn | 1.5 | 0.87 |

The purified starting materials can then be mixed with a precipitant such as ammonium hydroxide, various carbonate derivatives, urea, potassium hydroxide (KOH), sodium hydroxide (NaOH) and/or their mixtures under controlled temperature and pH conditions to produce a gel-like dispersion of suspended particles in the precipitant. If necessary, the mixture can be sonicated during this step to break up large particles in the suspension.

The gel-like dispersion of the starting materials in the precipitant can then be cooled, filtered, and washed several times with deionized (DI) water to remove byproducts and any unreacted materials, forming a gel-like precursor cake.

In accordance with the present invention, replacing the water molecules in the gel-like cake with a bulky (but still miscible with water) agent will prevent the formation of closely packed hard agglomerates, and washing the cake with the agent under vigorous stirring results in a uniform ultrafine nanopowder without agglomerates after drying. In some cases the stirring can be combined with ultrasonication to further improve the fineness of the powder.

Thus, in accordance with the present invention, after being washed with DI water, the wet precursor cake can then be transferred to a container such as a beaker containing a non-water washing agent having little or no hydrogen bonding capability, such as acetone or tetrahydrofuran, to form a suspension. The suspension is then vigorously stirred and/or sonicated until most of the water is replaced with the washing agent and the suspension breaks up into smaller-sized particles. This stirring/sonication step can be repeated a number of times until most of the water is removed from the suspension.

The suspension is then allowed to sit while the larger particles, i.e., the hard agglomerates, are collected at the bottom of the beaker. The hard agglomerates at the bottom are discarded and the suspension is collected. The collected suspension can then be centrifuged to remove finer particles that may be remaining in the suspension and a loosely packed wet powder is collected from the bottom of the centrifuge bottle.

The loosely packed wet powder is then dried under heat and ground, e.g., with a mortar and pestle to produce a loosely packed ground power, and the ground powder is then calcined at a temperature between about 400° C. and about 1300° C. to produce agglomerate-free nanopowders. If any soft agglomerates remain in the powder after calcination, the powder can be gently ball-milled to remove any remaining agglomerates to produce an agglomerate-free nanopowder. Because of the lack of hard agglomerates in the dried powder, milling can be accomplished in less than one hour, compared to over 100 hours needed to break up hard agglomerates in $Yb^{3+}$ doped $Y_2O_3$ nano-powders produced using conventional processes.

These and other aspects of the present invention are described in more detail below in the context of the following Examples.

EXAMPLE 1

In this example, a $Yb^{3+}$ doped $Y_2O_3$ powder was prepared according to conventional processes, using yttrium nitrate and ytterbium nitrate as starting materials.

First, an appropriate amount of yttrium nitrate hydrate and ytterbium nitrate hydrate was dissolved in DI water. The nitrate solution was dropped into a reaction bath containing a precipitant at a constant dropping rate using a peristaltic pump under mild stirring using a magnetic stirring bar.

The reaction mixture was stirred for 1 hour and cooled to room temperature. The cooled mixture was filtered and washed with DI water 4 times to produce a wet powder.

The wet powder was dried at ~110° C. for 24 hours and ground with pestle and mortar. The powder was then calcined at 800° C. for two hours to produce the final powder.

Figure 1A:
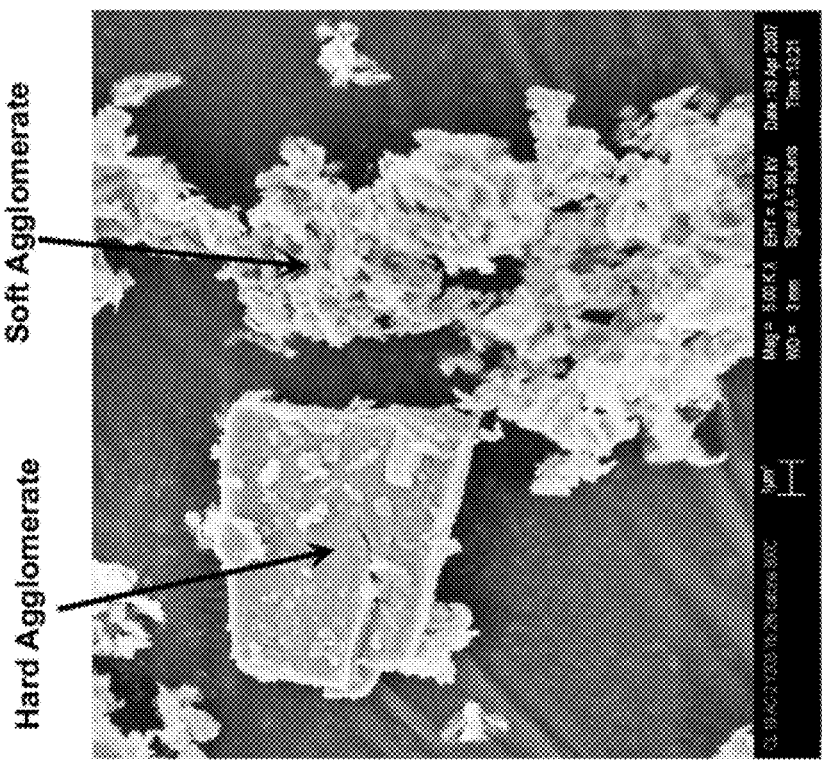

FIGS. 1A and 1B depict two SEM micrographs, at different magnification, of Yb:$Y_2O_3$ powder obtained by this conventional method, highlighting hard agglomerates shown in the picture. FIG. 1A shows a large (several microns wide)) hard agglomerate with a few smaller soft agglomerates situated on top of the hard agglomerate and a cluster of soft agglomerates situated alongside the hard agglomerate. FIG. 1B shows a higher magnification SEM micrograph, further highlighting the presence of a large hard agglomerate with several smaller soft agglomerates sitting thereon.

EXAMPLE 2

This example describes aspects of an exemplary embodiment of a process for synthesizing high purity $Yb^{3+}$ doped $Y_2O_3$ nanopowder in accordance with the present invention, using metal nitrate as starting material.

In this example, a Yb:$Y_2O_3$ nanopowder in accordance with the present invention can be synthesized by first precipitating the hydroxynitrate precursors in an aqueous solution using nitrate starting materials and ammonia as a precipitant.

As a first step in the synthesis process, an amount of yttrium nitrate ($Y(NO_3)_3$) hydrate and ytterbium nitrate ($Yb(NO_3)_3$) hydrate appropriate to produce the final product with the correct doping level of Yb can be dissolved in DI water and the mixed nitrate solution filtered with a submicron size filter to remove the insoluble impurities from the solution. Next, the nitrate solution can be mixed in a reaction bath with a chelating agent such as ethylenediamine tetraacetic acid (EDTA) and the mixture maintained at a pH level above 8.5 to remove cationic impurities such as $Fe^{3+}$ metal ions from the solution. As described with respect to Table 1 above, the use of EDTA significantly reduces the levels of such ionic impurities in the final powder.

The thus-purified nitrate solution can then be dropped into a precipitation bath comprising a warm ammonium hydroxide solution at a constant dropping rate using a peristaltic pump under vigorous stirring to precipitate the Yb:$Y_2O_3$ particles out of the nitrate solution. The pH of the precipitation bath should be carefully monitored and maintained at the proper level, typically between 8.5 and 12, and the temperature maintained at a temperature between 50° C. and 85° C. The mixture can be stirred for 1 hour and cooled to room temperature. In some cases, the reaction is carried out in an ultrasonication bath to break the precursor particles.

After the particles have precipitated out of the nitrate solution, the mixture can be cooled to room temperature and the cooled mixture can be filtered and washed with DI water to form a gel-like wet precursor cake. This filtering and washing step can be repeated several times.

The inventors have found that replacing the water molecules in the gel-like cake with a bulky washing agent (e.g., one containing a large number of alkyl groups or the like) that is still miscible with water will prevent the formation of closely packed hard agglomerates. Therefore, in accordance with the present invention, the wet precursor cake can then be transferred to a container containing a non-water washing agent such as acetone or tetrahydrofuran (THF) to form a suspension.

The suspension of the wet precursor cake and the washing agent can then be stirred vigorously (sometimes in combination with ultrasonication) until a major portion of water is replaced with the washing agent and the precipitated Yb:$Y_2O_3$ cake breaks into smaller and smaller particles. The precursor suspension is then allowed to sit for a while until the majority of the hard agglomerates are collected in the bottom of the beaker. The remaining fine suspension is collected and the hard agglomerates in the bottom of the beaker are discarded.

The fine particles can then be removed by centrifuging the suspension and collecting the particles as a loosely packed wet powder. The loosely packed wet powder can be dried at ~110° C. for 24 hours and ground with pestle and mortar.

Finally, agglomerate-free Yb:$Y_2O_3$ nanopowders can be obtained after calcination of the loosely packed powder at a temperature between 400° C. and 1300° C. If any soft agglomerates remain after calcination, a mild milling was employed to break them into nanopowders.

Figure 2B:
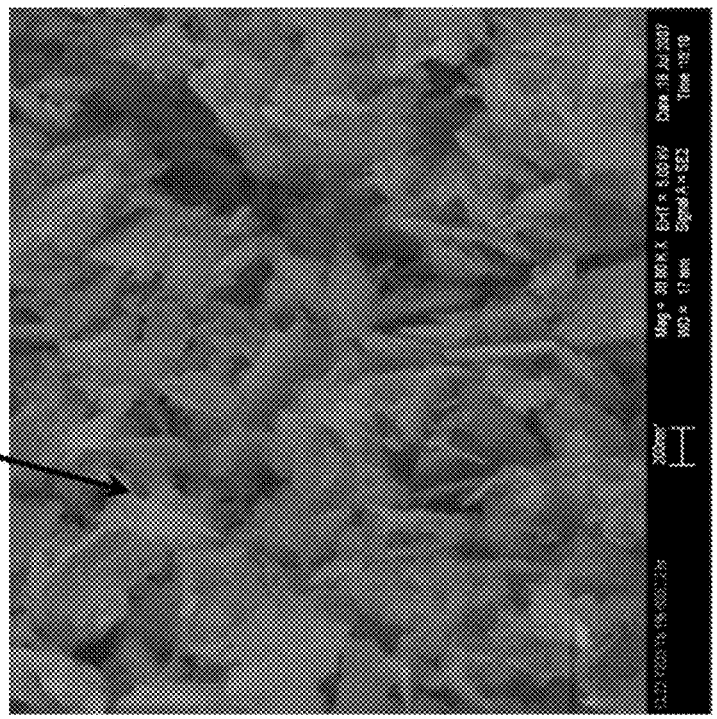
FIGS. 2A and 2B are SEM photographs of Y$_2$O$_3$ particles synthesized in accordance with the present invention, which comprise 50-100 nm-sized particles having only soft agglomerates.
Figure 2A:
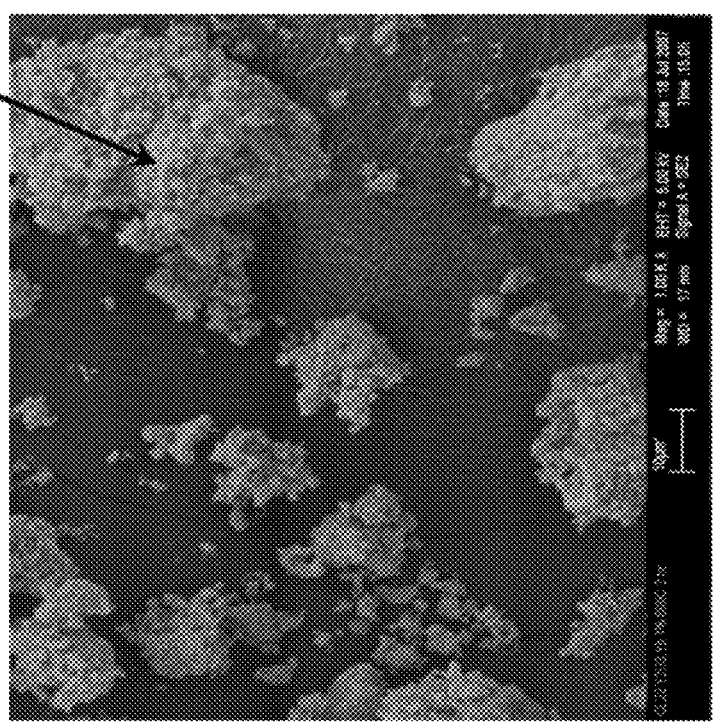

FIGS. 2A and 2B show SEM pictures, at low and high magnification respectively, of an exemplary powder obtained by this method. Powders containing exclusively soft agglomerates are clearly shown in the picture.

EXAMPLE 3

In this example, the same process as described above with respect to Example 2 can be used to synthesize high-purity $Yb^{3+}$ doped $Y_2O_3$ nanopowder using metal chlorides as starting materials. Thus, in accordance with the present invention, a Yb:$Y_2O_3$ nanopowder having a high uniformity and no hard agglomerates can be produced using yttrium chloride ($YCl_3$) hydrate and ytterbium chloride ($YbCl_3$) hydrate in the same manner as described above for producing powders using yttrium nitrate ($Y(NO_3)_3$) hydrate and ytterbium nitrate ($Yb(NO_3)_3$) hydrate. In both cases, the use of a non-water washing agent having little or no hydrogen bonding capability, such as acetone or tetrahydrofuran (THF), can prevent the formation of hard agglomerates in the reaction solution and thus facilitate the production of a Yb:$Y_2O_3$ nanopowder having a high uniformity and no hard agglomerates.

Thus, prior art processes provide inhomogeneous Yb:$Y_2O_3$ powders having hard agglomerates, which are unsuitable for producing high-quality transparent ceramics that can be used, for example, as solid state laser materials. In contrast, by using a washing agent to replace the water during the stirring step, the present invention provides agglomerate-free high-purity uniform Yb:$Y_2O_3$ nanopowders that can be used to produce high-quality transparent ceramics having few defects or other scattering sites.

Although particular embodiments, aspects, and features of agglomerate-free high-purity Yb:$Y_2O_3$ nanopowders and processes for making the same have been described and illustrated, it should be noted that the invention described herein is not limited to only those embodiments, aspects, and features. It should be readily appreciated that modifications may be made by persons skilled in the art, and the present application contemplates any and all modifications within the spirit and scope of the underlying invention described and claimed herein. Such embodiments are also contemplated to be within the scope and spirit of the present disclosure.

What is claimed is:

1. A process for making a ytterbium-doped yttrium oxide ceramic nanopowder, comprising:
    forming a wet precursor cake comprising water, a yttrium compound, and a ytterbium compound;
    transferring the precursor cake to a container containing a non-water washing agent having little or no hydrogen bonding capability, wherein the precursor cake and the washing agent form a suspension;
    stirring the suspension of the precursor cake and the washing agent until most of the water in the precursor cake is replaced with the washing agent and the precursor cake breaks up into particles, at least some of the particles being in the form of hard agglomerates;
    allowing the suspension to sit in the container for a period of time, wherein the hard agglomerates are collected at the bottom of the container;
    discarding the collected hard agglomerates and transferring the remaining suspension to a centrifuge bottle;
    centrifuging the suspension to remove additional particles from the suspension, wherein a loosely packed wet powder remains at the bottom of the centrifuge bottle;
    collecting the loosely packed wet powder from the bottom of the centrifuge bottle;
    drying the wet powder under heat;
    grinding the dried powder to produce a loosely packed ground powder; and
    calcining the ground powder at a temperature between about 400° C. and about 1300° C.;
    wherein the calcined ground powder is a nanopowder having a high uniformity and low presence of hard agglomerates.

2. The process according to claim 1, wherein the starting materials comprise yttrium nitrate ($Y(NO_3)_3$) hydrate and ytterbium nitrate ($Yb(NO_3)_3$) hydrate.

3. The process according to claim 1, wherein the starting materials comprise yttrium chloride ($YCl_3$) hydrate and ytterbium chloride ($YbCl_3$) hydrate.

4. The process according to claim 1, wherein the step of forming the precursor cake comprises:
dissolving a ytterbium starting material and a yttrium starting material in a solvent to form a solution;
chelating the solution with a chelating agent to remove cations and form a purified solution;
precipitating the purified solution in a precipitation bath at a controlled temperature and controlled pH to form a dispersion comprising a plurality of large precipitates and a suspension of small precipitates in the precipitation bath; and
removing the large precipitates from the precipitation bath, wherein the suspension of small precipitates forms the precursor cake.

5. The process according to claim 4, wherein the temperature of the precipitation bath is maintained at about 50° C. to about 85° C.

6. The process according to claim 4, wherein the pH of the precipitation bath is maintained between about 8.5 and 12.

7. The process according to claim 1, wherein the chelating agent is ethylenediamine tetraacetic acid.

8. The process according to claim 1, wherein the chelating agent is maintained at a pH above about 8.5.

9. The process according to claim 1, wherein the washing agent is acetone.

10. The process according to claim 1, wherein the washing agent is tetrahydrofuran.

11. The process according to claim 1, further comprising sonicating the suspension of the cake and the washing agent to break up the cake into particles.

12. The process according to claim 1, further comprising ball milling the ground powder after it is calcined.

13. A process for making a ytterbium-doped yttrium oxide ceramic nanopowder, comprising:
preparing a solution comprising water and a yttrium compound and a ytterbium compound as starting materials;
filtering the solution to remove insoluble impurities therefrom;
mixing the filtered solution in a high-pH reaction bath with a chelating agent to further purify the starting materials;
mixing the purified starting materials with a precipitant to produce a dispersion of suspended $Yb:Y_2O_3$ particles in the precipitant;
cooling, filtering, and washing the dispersion of $Yb:Y_2O_3$ particles in the precipitant to form a wet $Yb:Y_2O_3$ precursor cake;
mixing the wet precursor cake in a container with a non-water washing agent having little hydrogen bonding capability to form a suspension of the precursor cake in the washing agent;
stirring the suspension of the precursor cake and the washing agent until most of the water in the precursor cake is replaced by the washing agent and the precursor cake suspension breaks up into particles, at least some of the particles being in the form of hard agglomerates;
allowing the suspension to sit in the container for a period of time, wherein the hard agglomerates are collected at the bottom of the container;
discarding the collected hard agglomerates and transferring the remaining suspension to a centrifuge bottle;
centrifuging the suspension to remove additional particles from the suspension, wherein a loosely packed wet powder remains at the bottom of the centrifuge bottle;
collecting the loosely packed wet powder from the bottom of the centrifuge bottle;
drying the wet powder under heat;
grinding the dried powder to produce a loosely packed ground powder; and
calcining the ground powder at a temperature between about 400° C. and 1300° C.;
wherein the calcined ground powder is a nanopowder having a high uniformity and low presence of hard agglomerates.

14. The process according to claim 13, wherein the starting materials comprise yttrium nitrate ($Y(NO_3)_3$) hydrate and ytterbium nitrate ($Yb(NO_3)_3$) hydrate.

15. The process according to claim 13, wherein the starting materials comprise yttrium chloride ($YCl_3$) hydrate and ytterbium chloride ($YbCl_3$) hydrate.

16. The process according to claim 13, wherein the chelating agent is ethylenediamine tetraacetic acid.

17. The process according to claim 13, wherein the chelating agent is maintained at a pH above about 8.5.

18. The process according to claim 13, wherein the washing agent is acetone.

19. The process according to claim 13, wherein the washing agent is tetrahydrofuran.

20. The process according to claim 13, further comprising sonicating the suspension of the cake and the washing agent to break up the cake into particles.

21. The process according to claim 13, further comprising ball milling the ground powder after it is calcined.

* * * * *